United States Patent [19]
Ewell et al.

[11] Patent Number: 5,737,309
[45] Date of Patent: Apr. 7, 1998

[54] METHOD AND APPARATUS FOR INTERFACE COMMUNICATIONS IN A TANDEM CROSS CONNECT

[75] Inventors: Lujack Ewell, Buford; Randy Holzworth, Lawrenceville; Larry A. Jackson, Roswell, all of Ga.

[73] Assignee: Conklin Instrument Corporation, Pleasant Valley, N.Y.

[21] Appl. No.: 556,229

[22] Filed: Nov. 9, 1995

[51] Int. Cl.⁶ ................ H04J 15/00; H04L 5/20
[52] U.S. Cl. .............. 370/200; 370/357; 370/513; 370/514; 375/366; 375/368
[58] Field of Search ............ 375/365, 366, 375/368, 370; 379/4.6, 224, 229, 236, 237, 238; 370/200, 357, 503, 509, 513, 514, 522, 360, 384; 359/115, 118, 135, 138

[56] References Cited

U.S. PATENT DOCUMENTS

| | | |
|---|---|---|
| 4,184,054 | 1/1980 | Shibata et al. ............... 370/5 |
| 5,243,593 | 9/1993 | Timbs ........................ 370/58.1 |
| 5,327,433 | 7/1994 | Hall ........................... 370/100.1 |
| 5,337,306 | 8/1994 | Hall ........................... 379/6 |

OTHER PUBLICATIONS

Exhibit F, Adtran product information—Model D4–DTDM, Aug. 1993.
Exhibit G, XEL product information—Model N8300–000, Feb. 24, 1994.

Primary Examiner—Alpus H. Hsu
Attorney, Agent, or Firm—Fish & Richardson P.C.

[57] ABSTRACT

A method and apparatus for effecting a digital communications in a tandem cross-connect of an intermediate station in a telephone system communications network to enable synchronization of the digital signals coupled between ports of the cross-connect. The method and apparatus provide center-tapped transformers at each port for coupling into the cross-connect, applying synchronizing signals to the center-tap of the transformer for raising and lowering the DC voltage of the transformer output cross-connect side without adversely affecting the signals being transmitted across the transformer coupled network, and processing received signals to identify and synchronize to repeating protocol patterns. In particular, the invention employs photo-optically coupling to the transformers to maintain electrical isolation of the synchronizing elements of the circuitry and employing the circuitry in particular in connection with synchronizing to the A and B signalling bits of a T1 protocol.

8 Claims, 3 Drawing Sheets

METHOD AND APPARATUS FOR INTERFACE COMMUNICATIONS IN A TANDEM CROSS CONNECT

The invention relates generally to telephone communication systems, and in particular, to a tandem channel cross connect in a telephone central office.

BACKGROUND OF THE INVENTION

In a telephone network utilizing wide band communications, the signals typically pass from the originating customer premise equipment to the telephone company central office equipment to, eventually, the terminating customer premise equipment. At each intermediate station, that is, at each intermediate telephone central office through which the signals pass, there is often provided an internal communications cross connect which connects each one of the twenty-four possible T1 channel signals from a first input port to the correct outbound port. The interconnection, often designated a tandem channel cross connect, must meet the various requirements of the telephone system. In particular, when the input communication signals are pulse code modulated T1 carriers, carrying, a plurality, usually twenty-four, of channels of, for example, digitally coded analog signals, the channels are multiplexed onto a wideband, serial digital data channel.

At the intermediate office, the incoming wideband T1 signals are demultiplexed at the receiving channel bank, and each channel is sent to a tandem cross connect unit. The tandem cross connect units provide not only the correct tandem interface between input and output channel bank units for the T1 channels, but for certain analog signals are required to maintain synchronization of the digital channels, so that the location of A/B signaling bits is properly identified.

In accordance with the T1 carrier protocol, the T1 channel has a data rate of 1.544 megabits per second, onto which typically 24 channels are multiplexed. The channels can represent analog or digital data in the most general case. When demultiplexed, each channel is organized into groups of digital data, and it is conventional to look at collections of twelve bytes (also designated frames) of data on the channel as a repeating group pattern. Within the twelve frames or bytes of a single channel provided by the channel bank, the sixth and twelfth bytes carry, in their low order bit, signalling bits designated as the A and B bits, respectively. These bits provide signalling information as required over the channel. The origination of these A/B bits is historical, dating from the use of the channels for analog (voice) information.

When T1 channels are interfaced in an intermediate telephone central office, the conventional practice is to direct the T1 channel, from the channel banks to and through a dedicated tandem cross connect interface pair of boards (which could be analog) which are interconnected by a cross connect which allows both easy access and testing by the central office's equipment. (Typically, the digital interconnect is through a DSX-0 which acts as a large patch board.) Thus, while modern digital communication methods are used, the cross connect must still meet certain prior analog standards; and since the cross connect does not provide the control and synchronization signals available from the channel bank to the tandem unit, the transmission from an input port on one side of the office to an output port elsewhere within the central office is performed over an internal communications net which loses certain of the synchronization information which is required to maintain knowledge of the location of the A and B bits for the next leg of the T1 communications transmission.

Various methods are in use for providing synchronization between the ports in a cross connect interface situation. One such method involves replacing other, low order bits of the digital signal transmitted across the interconnect channel, so that at the receiving side, the knowledge of the added bit pattern enables the receiver to identify the A and B control bits, and thus allow the receiver to resynchronize to what had become an asynchronous signal. This can cause some distortion of the analog signal being represented by the digital communications, and in addition, the inserted bits must be changed at the receiving port so that a receiver at the next intermediate central office does not incorrectly identify them as a synchronization pattern.

An object of the invention is therefore an improved digital tandem cross connect method and apparatus which avoids any distortion or other loss of information in the cross connect signal, while maintaining the capability of synchronizing and framing the signal at the receiving port. Other objects of the invention include a simple and reliable method and apparatus which provide synchronization capabilities without interfering with the operation of normal test and maintenance procedures at the intermediate central office.

SUMMARY OF THE INVENTION

The invention relates to a method for effecting a cross connect digital communications between ports of an intermediate station in a telephone communications network. The ports each provide a transformer coupling to a digital cross connect internal station communications net and the method provides synchronization of a repeating protocol of digital signals output from one of the ports to the internal station communications net (the cross-connect), the signals being received as an asynchronous signal at a second port of the internal communications net. The method features the steps of providing center-tapped transformers at each port for coupling to the internal station communications net, applying a synchronizing electrical signal to the center-tap of the transformer at a first one of the ports for identifying a selected portion or portions of a repeating protocol associated with the digital signals, receiving the synchronizing electrical signal through the center-tap of a second transformer at a second port connected to the internal communications net, and processing the received synchronizing electrical signal for synchronizing to the repeating protocol of the received asynchronous signal.

In specific aspects of the invention, the method features the steps of applying a pulsed electrical signal for repeatedly identifying a specific repeating portion of each repeating protocol pattern of the digital cross connect signal, without denigrating the information being carried by the digital signals. In a preferred embodiment, the method features the step of photo-optically coupling the synchronizing electrical signal to the center tap of the transmitting transformer and at the receiving end, photo-optically coupling the synchronizing electrical signals received from the center-tap of the receiving transformer at the second port for receiver processing.

In another aspect of the invention, the apparatus of the invention relates to effecting digital communications between cross connected internal ports of an intermediate station in a telephone communications network, wherein each port provides a transformer coupling to the digital cross connected internal station communications net. The apparatus provides for synchronizing to a repeating protocol of the digital signals output from one of the ports to the cross connect communications net which are received asynchronously at a second port on the net. The apparatus features center-tapped transformers at each port for coupling to the internal station communications net, circuitry for applying a synchronizing electrical signal to the center tap of the transmitting transformer at the first port for identifying a selected portion of the repeating protocol associated with the digital signals, circuitry for receiving the synchronizing electrical signals through the center tap of the receiving transformer located at the second port, and a decoder for processing the received synchronizing electrical signals for synchronizing to the repeating protocol pattern of the received asynchronous digital signals.

In specific aspects of the apparatus of the invention, there is further featured circuitry for applying a pulsed electrical signal for repeatedly identifying a specific repeating portion of each repeating protocol pattern without distorting or otherwise denigrating the information being carried by the digital signals. Preferably, the apparatus includes photo-optical coupling circuitry both at the transmitter and the receiver for, respectively, applying the synchronizing electrical signal to the center-tap of the transmitting transformer and for receiving the received synchronizing electrical signals from the center-tap of the receiver transformer at the second port.

BRIEF DESCRIPTION OF THE DRAWINGS

Other objects, features, and advantages of the invention will be apparent from the following description taken together with the figures in which.

DESCRIPTION OF A PREFERRED PARTICULAR EMBODIMENT

Figure 1:
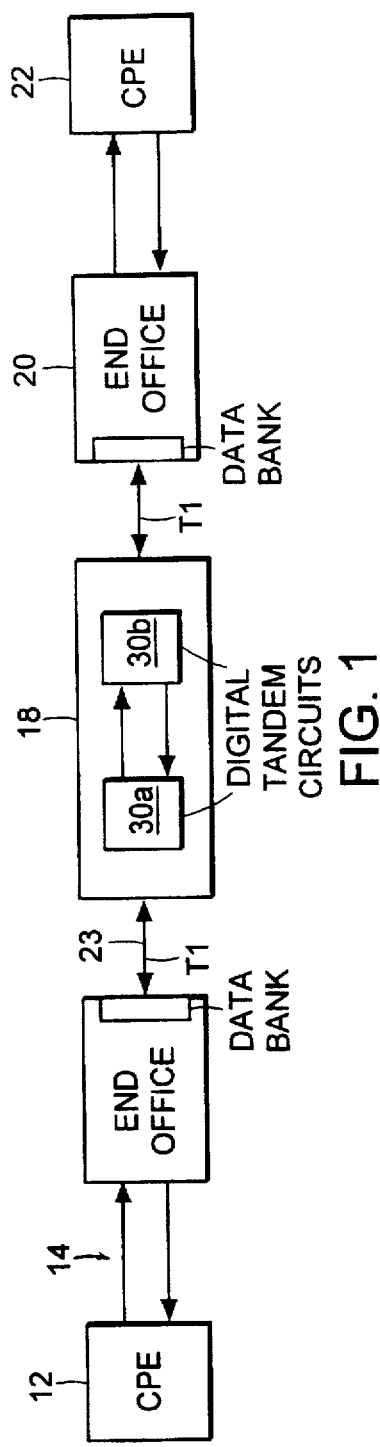
FIG. 1 is a block diagram of a telephone communications system in which the present invention is useful.

Referring to FIG. 1, in a telephone communications network 10, there is typically provided a customer premise equipment 12 at the customer's location connected through either a two wire or four wire line 14 to a local end office 16. The end office is connected through one or more intermediate stations 18 in the telephone communications network to an end office 20 located closest to the receiver, that is, the receiving customer premise equipment 22. The connection between the end office 20 and customer premise equipment 22 can be either a two wire or four wire line while typically, in a preferred embodiment generally, the connections from end office 16 through one or more intermediate offices 18 to end office 20 is through T1 facilities operating at 1.544 megabits per second.

Figure 2:
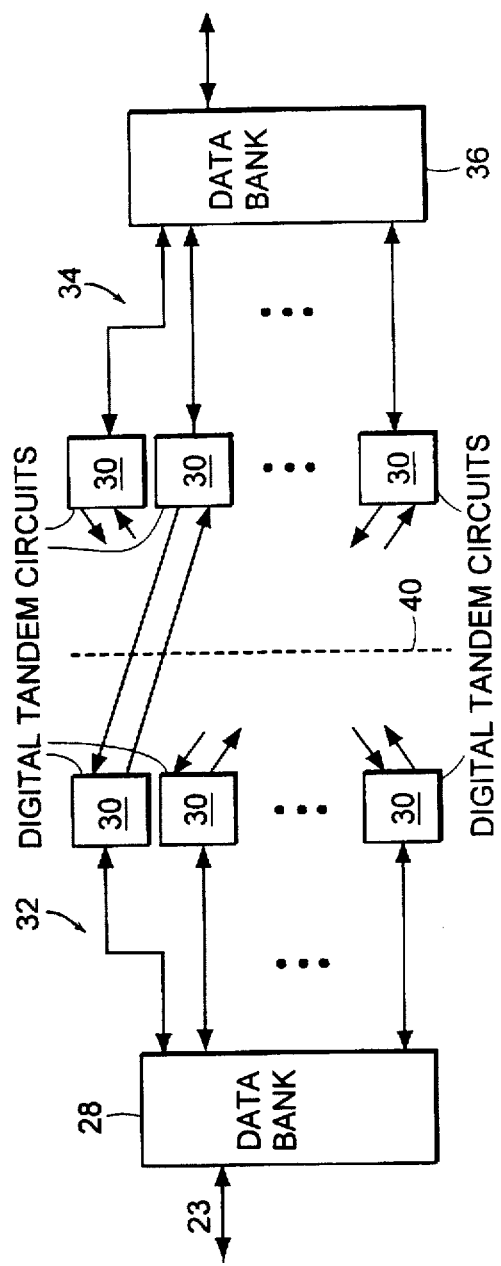
FIG. 2 is a block diagram of the intermediate telephone central office or station in which the invention finds particular use.

Within the intermediate office, referring to FIG. 2, the incoming T1 transmission over a line 23 is received by the telephone D4 channel bank 28 which demultiplexes the incoming T1 signals and provides each of the 24 channels to a digital tandem circuit 30. The connections between the channel bank and each digital tandem circuit 30 over interconnecting channels 32 each of which represents the path of a single T1 channel. Each channel 32 includes both data signals and control or synchronizing signals. As is well known, this single T1 channel, has a repeating protocol which includes 12 bytes or frames of data. In particular, the least significant bit of the sixth and twelfth data frames are encoded with synchronizing signals which are designated as the A and B bits. These signals provide signalling information for the voice signal represented by the digital signals of the T1 channel which enables the groups of twelve frames to be properly processed.

In the typical system, the channel bank provides the necessary information over channel 32 to enable the digital tandem circuits 30 to determine and identify the locations of the A/B bits. The circuits 30 are interconnected within the internal intermediate office communications net, the cross connect usually in a hard wired plug board fashion over a DSX-0 (indicated by a dashed line 40). Two complementary circuits 30, of the same design, take the T1 channel data coming from the channel bank over data and control lines at the receive end, and provide data in a synchronized format to a second channel bank 36 at the transmit side of the intermediate station over data and control lines of channels 34. The transmit data is combined by the channel bank 36 to form a full T1 line operating at 1.544 megabits per second, and sends it to the next stop along the network which can be either another intermediate office or an end office. (It should be recognized, of course, that channel banks 28 and 36 each operate both to receive the T1 data from the telephone communications network and to provide signal communications in the reverse direction to the telephone network and that tandem units 30 each have both a transmitting section and a receiver section.)

The digital tandem units 30, in connecting between ports through the cross connect must meet various telephone communications protocols. In particular, in meeting the cross connect protocol, the location of the signalling data transmitted across the DSX-0 interconnect represented by the dashed line 40, that is the location of the A and B signaling bits, is lost. The bits themselves are not destroyed or changed, merely the synchronization is lost so that the receiver is no longer able to determine, solely by examining the data stream, where the A and B bits are. This is a serious handicap since along with loss of the location of the A and B bits comes also loss of signalling information required by the system.

Figure 3:
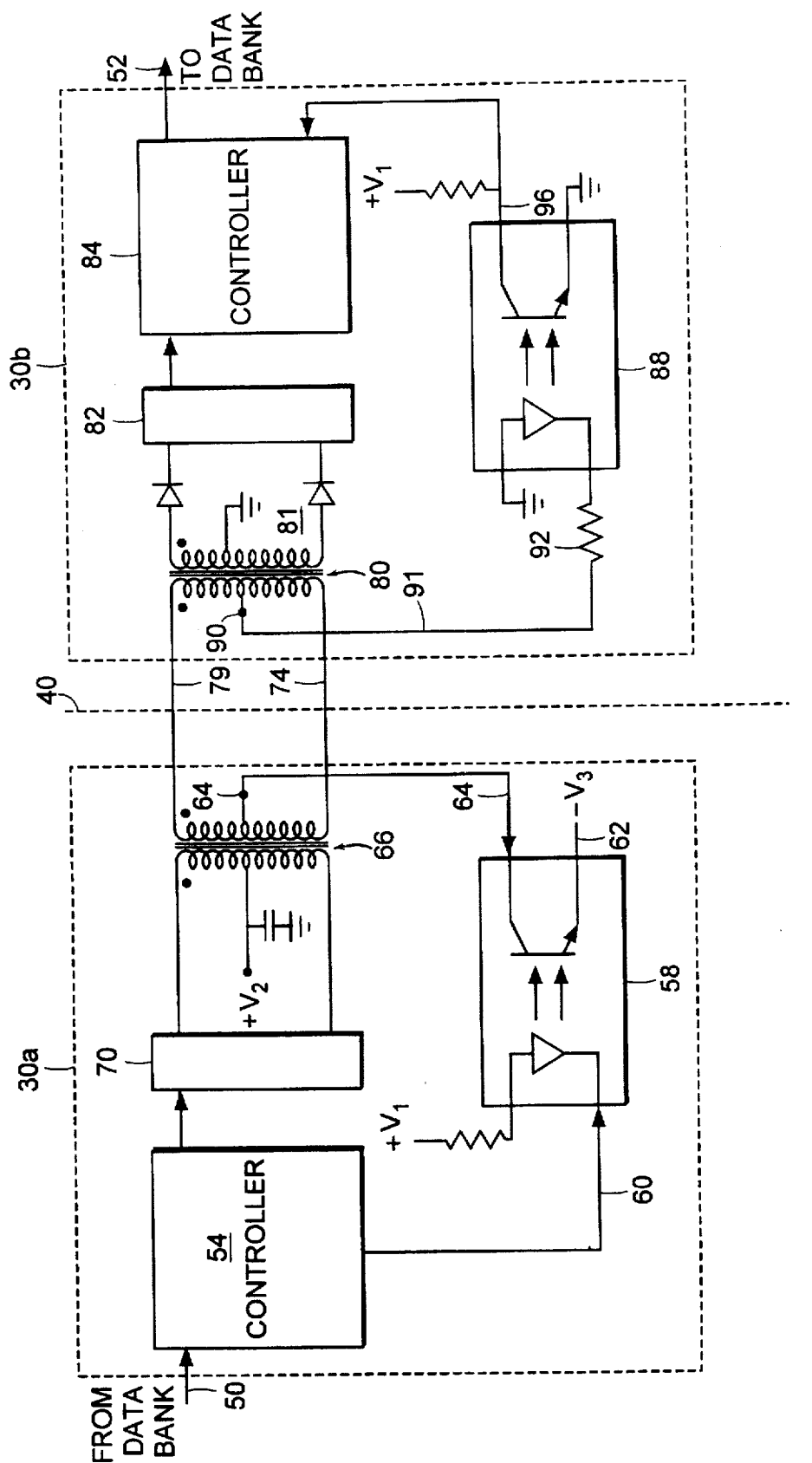
FIG. 3 is a block diagram illustrating the particular circuitry useful in implementing the invention according to a preferred embodiment thereof.

Referring now to FIG. 3, the typical connection between the digital tandem circuit and the telephone communications internal cross connect network is made by a transformer coupling to provide a balanced line output to the cross connect. In accordance with the illustrated embodiment of the invention, each transformer coupling is modified so that both sides of the transformer are center-tapped. Then, at the transmitting transformer, the center-tapped terminal on the cross connect side is connected to a source of varying voltage, the voltage variations identifying the location of the A and B bits.

Still referring to FIG. 3, there is illustrated a typical cross-connect digital tandem circuit system in accordance with the invention. A digital data stream, a T1 channel from a channel bank is input to digital tandem circuit 30a over a line 50 and is received by a microprocessor controller 52 for processing and transmission to the other of the digital tandem circuit of the cross connected pair 30a, 30b, which will transmit the received digital stream, in a synchronized manner, to an outgoing channel bank over a line 52.

At the transmitting digital tandem circuit 30a, the incoming data stream from the channel bank is read by a microprocessor 54 and is analyzed, as is well known in the art. In particular its frame timing is determined. Once the frame timing is determined, the timed locations of the A and B bits are known and in accordance with those timings, a digital pulse signal is sent over a line 60 to turn on the optical diode of a photo-optical coupling circuit 58. In effect, at the beginning of the frame (byte) which contains the A bit, the photo diode of the photo-optical coupler 58 is turned on by grounding line 60; and as a result, the transistor of photo-optical coupler 58 provides a substantial short circuit between its emitter and collector, lines 62 and 64 respectively. As a result, a pulse of negative voltage, in the illustrated embodiment 48 volts, is applied to the center-tap 64 of a coupling transmitter transformer 66. The transformer 66 is connected, at its input side, to the microprocessor 54 through an analog generating signal circuitry 70 which generates the necessary analog signals to apply to transformer 66. Transformer 66, in combination with photo-optical coupling device 58, effectively electrically isolates the cross connect from circuits 30a, that is, from the other electrical signals in the system.

Without the center tap connection 64, the signals passing between circuits 30a and 30b, which follow an alternate mark inversion, non return to zero protocol, would have effectively no DC bias and would be sent as is well-known in the art as balanced signals over connecting lines 74 having in effect a zero average current. This is a balanced transmission system. The effect of activating photocoupler 58 by an activating synchronizing signal over line 60 is to change the effective DC component on the lines connecting circuits 30a and 30b, that is, lines 74. The change in DC bias, actually the resulting DC current, can be received, and recognized, at the receiving unit 30b. Even though the DC bias on the transformer output is changed, the output side 81 of a receiving transformer 80 is unchanged as a pulse detector circuit 82 receives and processes the signal information over lines 74 for use by a microprocessor 84. This occurs since the digital information signals being provided to the center top of transformer 66 are coupled in a balanced configuration. The result is that any change in the center-tap signal value at the output of transformer 66 only affects the input side of transformer 80.

The DC bias shift, which enables the transmission of synchronizing signals over lines 74, without affecting the underlying digital signal transmission to be received by circuit 30b, enables a second photo-optical coupler 88 to decode and transmit to the microprocessor 84 the synchronizing signals which enable the microprocessor to properly frame the incoming digital data from the unit 30a.

Accordingly, transformer 80, at its input, has a center-tap connection 90 which connects, through a resistor 92 to the photodiode portion of photo-optical coupler 88. When the DC bias is lowered sufficiently from a ground level, as occurs when the substantial negative voltage is applied to the center-tap output of transformer 66, the current drawn through the photo diode causes it to turn on, and emit sufficient energy to turn on the transistor portion of the photo-optical coupler 88, thereby pulling the collector of that transistor, connected over a line 96, to a ground level from its previous level at $+V_1$ volts. (In the illustrated embodiment, $V_1=5$ volts.) The microprocessor 84, which is connected to the output of the photocoupler over line 96, upon recognizing the change of voltage (+5 volts to ground), determines that the digital signal bit then coming to it from the pulse detector circuit 82 represents, in the illustrated embodiment, the first bit of the sixth byte of a grouping of twelve frames of digital data. The microprocessor then acts, in a manner well known in the art, to frame the incoming data so that the current byte is properly aligned and designated the sixth byte, to which the remaining bytes of the group are aligned. Accordingly, the output signals provided by microprocessor 84 over lines 52 to the channel bank, represent a synchronized and properly framed T1 channel signal which is then combined at the channel bank, with other (properly framed) T1 channel signals to form the full T1 signal at 1.544 megabits per second.

Figure 4:
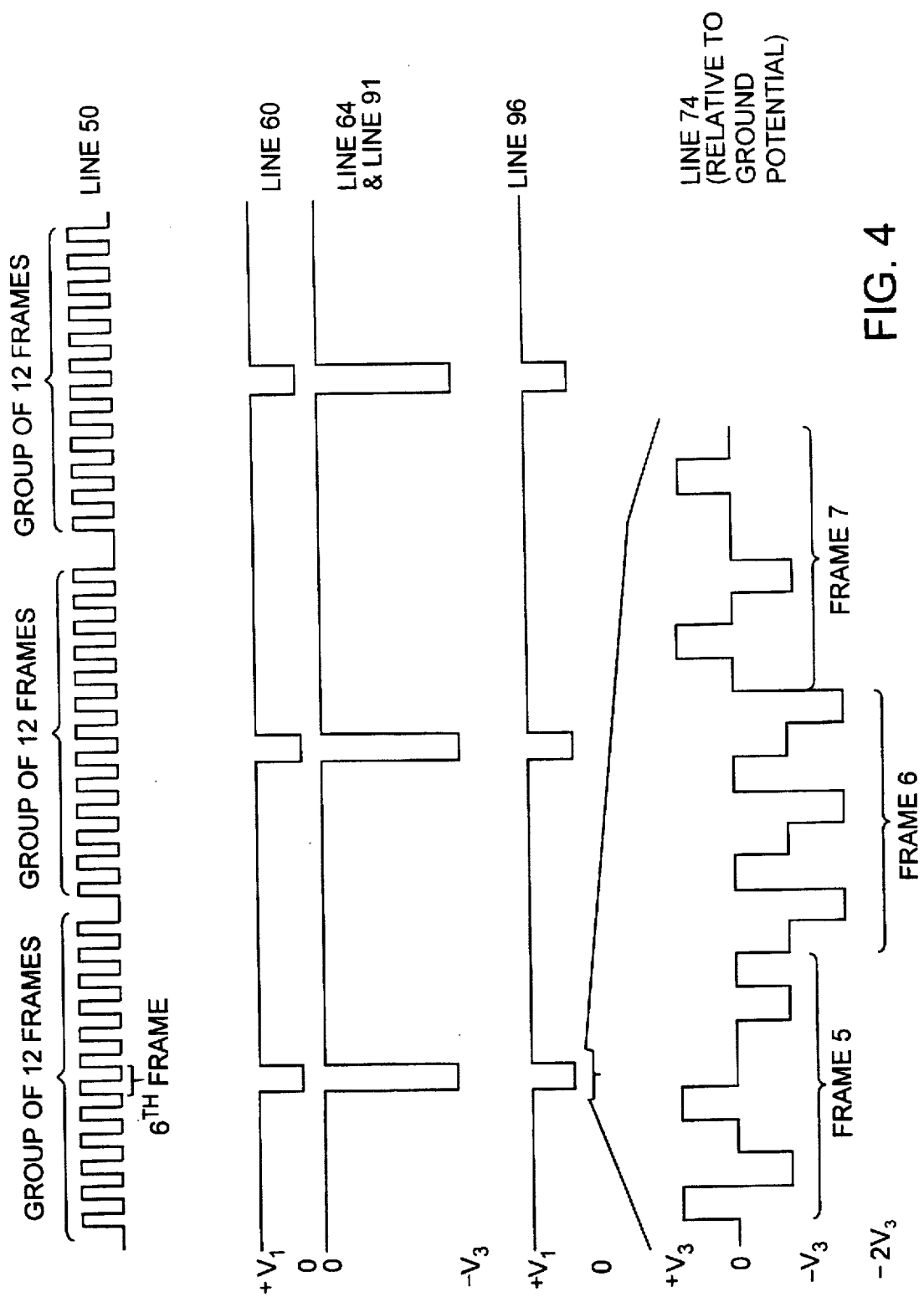
FIG. 4 is a diagram of various signals found in connection with a preferred embodiment of the invention.

Referring now to FIG. 4, there is illustrated a timing diagram showing the relative timing of the signals over lines 50, 60, 65, 91, 96, and 74. It can be seen, therefore, that once the location of the synchronization signal over line 60 has been specified, that the signal propagates through the photo-optical coupler to the center-tap of transformer 66, through lines 74 of the digital tandem cross connect, through transformer 80 to line 91, to photo-optical coupler 88 and is eventually received through microprocessor 84 in a manner to enable it to properly synchronize the digital signal flow which normally traverses the path between transformers 66 and 80. The only difference is that the DC signal level over lines 74 is translated to a different level at the time when the synchronization information is provided, in order to identify the location of the sixth byte of the group of frames.

Additions, subtractions, and other modifications of the disclosed preferred embodiment of the invention will be apparent to those practiced in the art and are within the scope of the following claims.

What is claimed is:

1. A method for effecting a cross connect digital communications between ports of an intermediate station in a telephone system communications network, said ports each providing a transformer coupling to a digital cross-connect internal station communications net, said method providing synchronization of a repeating protocol of digital signals output from one said port to the internal station communications net and received as asynchronous signals at a second port of said communications net, said method comprising the steps of:

providing center-tapped transformers at each port for coupling to said internal station communications net, applying a synchronizing electrical signal to said center-tap of the transformer at the first port for identifying a selected portion of the repeating protocol of said digital signals, receiving said synchronizing electrical signal through said center-tap of the second transformer at the second port, and processing, at a receiver, said received synchronizing electrical signal for synchronizing to said repeating protocol of said received asynchronous signals.

2. The method of claim 1 wherein said applying step comprises the step of applying a pulsed electrical signal for repeatedly identifying a specific repeating portion of each repeating protocol without denigrating the information being carried by said digital signals.

3. The method of claim 2 wherein said digital signals comprise groups of frames of digital signals, and said repeating protocol comprises a repeating synchronization pattern in each group of frames of the digital signals, each group having a selected number of bytes, and said pulse signals occur at prescribed positions within said groups of frames for identifying a specified timing within said group of frames.

4. The method of claim 1 further wherein said applying step comprises the step of
- photo-optically coupling said synchronizing electrical signal to said center-tap of said transformer at said one port, and
- said receiving step comprises the step of photo-optically coupling, to a receiver processor, said synchronizing electrical signal received from said center-tap of said second transformer at the second port.

5. Apparatus for effecting a cross connect digital communications between internal ports of an intermediate station in a telephone system communications network, said ports each providing a transformer coupling to a digital cross-connect internal station communications net, said apparatus providing synchronization of a repeating protocol of digital signals output from one said port to the internal station communications net and received as asynchronous signals at a second port of said communications net, said apparatus comprising:
- a center tapped transformer at each port for coupling to said internal station communication net,
- means for applying a synchronizing electrical signal to said center-tap of the transformer at said one port for identifying a selected portion of the repeating protocol of said digital signals,
- means for receiving said synchronizing electrical signal through said center-tap of the second transformer at the second port, and
- a decoder at a receiver for processing said received synchronizing electrical signal for synchronizing to said repeating protocol in said asynchronous received signals.

6. The apparatus of claim 5 wherein said applying means comprises
- means for applying a pulsed electrical signal for repeatedly identifying a specific repeating portion of each repeating protocol without denigrating the information being carried by said digital signals.

7. The apparatus of claim 6 wherein
- said digital signals comprise groups of frames of digital signals, and
- said repeating protocol comprises a repeating synchronization pattern in each group of frames of said digital signals, each group having a selected number of bytes, and said pulse signals occur at prescribed positions within said group of frames for identifying a specified timing within said frames.

8. The apparatus of claim 5 further wherein said applying means comprises
- a photo-optical coupler for applying said synchronizing electrical signal to said center-tap of said transformer at said one port, and
- said receiver comprises a photo-optical coupler for receiving said received synchronizing electrical signal from said center-tap of said second transformer at the second port.

* * * * *